United States Patent [19]

Kumandan

[11] 4,131,062
[45] Dec. 26, 1978

[54] DECLUSTERER DEVICE

[75] Inventor: Ramakrishnarao K. Kumandan, Columbus, Wis.

[73] Assignee: Hughes Company, Inc., Columbus, Wis.

[21] Appl. No.: 831,762

[22] Filed: Sep. 9, 1977

[51] Int. Cl.² .................. A23N 15/02; A47J 21/00
[52] U.S. Cl. ................................ 99/638; 130/30 R; 99/640
[58] Field of Search .................. 99/635, 637–640; 130/30 R

[56] References Cited

U.S. PATENT DOCUMENTS

| 3,304,974 | 2/1967 | Urschel | 99/639 |
| 3,405,750 | 10/1968 | Weirauch | 99/640 |

Primary Examiner—Leonard D. Christian
Attorney, Agent, or Firm—Theodore J. Long; Harry C. Engstrom; Nicholas J. Seay

[57] ABSTRACT

A declusterer device for engaging and removing clusters of pod vegetables joined together by stem sections from a mass of such vegetables and presenting such clusters to knives for cutting. A plurality of axially spaced stiffener partitions are disposed in an inclined cylindrical drum constructed of connected cylindrical segments in a conventional manner. Each partition has a central passage through which pod vegetables pass which is defined by a plurality of substantially straight primary edges. Notches are defined between each adjacent pair of primary edges by the extended end of one primary edge and a retaining edge extending therefrom in trailing relation to the point of termination of the leading end of the adjacent primary edge. The adjacent primary edges are spaced sufficiently to permit the stem sections of the vegetable clusters to be received within the notches for engagement by the retaining edges when the drum and baffles are rotated to remove the clusters from the mass. Intermediate notches are also provided at intermediate positions on the primary edges, and are defined by forward and retaining edges each extending at an angle to the adjacent primary edge. The partitions are oriented in the drum so that the primary edges defining the central passages of adjacent partitions are not in axial registry to agitate and facilitate separation of individual pod vegetables and clusters from the mass.

17 Claims, 4 Drawing Figures

DECLUSTERER DEVICE

BACKGROUND OF THE INVENTION

1. Field of the Invention

My invention relates to machines for processing pod-type vegetables and more particularly to declustering machines designed to subdivide clusters of pods prior to further processing.

2. Description of the Prior Art

When pod vegetables such as green beans are commerically harvested by machines, the pods frequently remain in clusters of two or more pods still fastened together by stem sections, and also include signle pods attached to undesirable stem sections. A necessary step in the processing of such vegetables is the subdivision of these clusters and the removal of excess stem sections so that individual pods may be further processed without waste or trash. Machines designed to subdivide such clusters are commonly referred to as declustering machines. Such a machine is described in Weirauch, U.S. Pat. No. 3,405,750.

The Weirauch machine is representative of a type of pod vegetable processing machine in which the vegetable is tumbled inside of a rotating drum. Such drums commonly comprise a multiplicity of cylindrical sections with slots penetrating their outer walls. The slots are adapted to allow the ends of pods to protrude as they tumble in the rotating drum. Knives sliding on the rotating exterior surface of the cylindrical sections cut off the protruding undesirable blossom and stem ends, a process generally referred to as "snipping". A multiplicity of such cylindrical sections are fastened end-to-end to form the drum. Partitions within the drum are adapted to maximize the likelihood that pods being processed in the drum will in fact come into contact with the outer wall of the cylindrical sections so that the ends of the pods may protrude through the slots for snipping. A passageway in each partition allows the vegetable pods being processed to migrate down the length of the rotating drum when the drum is elevated at one end.

As increasing numbers of pods are introduced into the drum, a characteristic phenomena called "roping" frequently occurs. The pods furthest from the outer edge of the drum become entwined into a relatively cohesive mass which progresses down the drum through the passages without being disturbed sufficiently to allow the individual pods to come into contact with the slots at the periphery of the drum. Attempts have been made, as in Weirauch, U.S. Pat. No. 3,405,750, to avoid roping by locating the passage in each partition so that it is not symmetrical with the central axis of the drum. Then each succeeding partition in the drum is so oriented relative to the preceding partition that the passages in them are not axially aligned. This arrangement shifts the pods in the center of the drum back and forth and tends to break up any mass of roping pods. Another effective method for dealing with roping is illustrated in the patent for a bean snipper machine issued to J. R. Urschel, U.S. Pat. No. 3,318,350. The passages in the partitions of Urschel's machine are in the form of straightsided geometric shapes with rounded corners. As the drum rotates, each straight side successively is thrust into and tends to break up any mass of roping pods.

The partitions in the Weirauch machine are further adapted to engage any clusters of pods present in the machine and thrust the stems of the clusters against rotating knives adjacent to the sides of the partitions to subdivide the clusters. To accomplish this purpose the margins of the offset, circular passages of the Weirauch partitions are serated by a series of slots into which the stems of clusters may drop and become engaged. One limitation of this design is that some clusters are so oriented that their stems pass over the slots and fail to drop into them. As a result the efficiency of the machine as a declusterer is not optimized.

There has continued to be a need in pod vegetable processing machines for a cluster-engaging surface that more efficiently engages clusters of pods so that they may be acted upon by another part of the machine. It would be an added advantage if this surface could be incorporated in a partition that efficiently discourages roping. Such a partition incorporating such a surface could then be employed in a drum of a multipurpose, pod vegetable processing machine to increase its efficiency while maintaining its simplicity of design.

SUMMARY OF THE INVENTION

I have invented a device for engaging and removing clusters of pod vegetables joined together by stem sections from a mass of such vegetables. The devices may be incorporated into machines for processing such vegetables, and more particularly may form part of an inner, cluster-engaging margin defining a passage in a partition within the drum of a rotating drum-type machine for processing clustered pod vegetables.

My device comprises a substantially flat body having a thickness less than the length of the stem sections connecting the pod vegetables to form clusters. The body has substantially upwardly facing, first and second primary edges having a projected point of intersection and defining an external angle of less than 180°. The primary edges may preferably be two of a plurality of equivalent edges defining a passage through a partition for a rotating drum of a machine for processing clustered pod vegetables.

The first primary edge extends beyond the projected point of intersection. The second primary edge has a point of termination spaced from the projected point of intersection to define a gap between the edges sufficiently large to admit the stems of pod vegetables to be engaged. A retaining edge extends from the point of termination at an internal angle of less than 180° to the second primary edge and intersects the first primary edge to define a notch in the body between the first primary edge and the trailing retaining edge. As the body is drawn through a mass of pod vegetables with the first and second primary edges upwardly facing, the stems of pod clusters will be engaged and retained by the retaining edge for removal from the mass. This engaging or "snagging" effect results from the direct action of the device on the pod clusters and does not require that the clusters first drop into a notch recessed in the body.

Preferably the cluster-engaging capabilities of my invention are further enhanced by the combination of at least one intermediate notch recessed within each of the primary edges. Each intermediate notch is defined by a trailing retaining edge extending from the primary edge at an angle of less than 180° thereto, and a forward edge which extends from the primary edge in opposed relation to the retaining edge and intersects therewith. The stems of clusters of pods will drop into the intermediate notch when the primary edge is substantially upwardly facing and be engaged by the retaining edge.

Because a pod cluster need not change direction or be wholly dependent on gravity to drop into a slot to become engaged by the slots between the primary edges of my improved drum partitions, my device is designed to engage a greater percentage of the clusters passing over it than do prior art cluster engaging surfaces. Furthermore, when the primary edges of my invention are combined with a plurality of similar edges to define a multiedge passage through a partition of a rotating drum of a drum-type vegetable processing machine, each primary edge will successively be thrust into the pods in the machine as the drum rotates. As a result, any mass of roping pods will tend to break up into individual pods and pod clusters which may then migrate to the periphery of the drum and be acted upon by the machine.

A primary object of my invention is to provide an improved device to positively engage and remove clusters of pod vegetables joined together by stem sections from a mass of such vegetables.

A second object of my invention is to provide a device for engaging clusters of pod vegetables that may be incorporated within partitions of the sort commonly used in drums for rotating-drum vegetable processing machines.

Another object of my invention is to provide a transverse partition for a drum of a rotating drum vegetable processing machine having an inner margin which will engage clusters of pod vegetables for delivery to cutting knives, and which will also minimize roping within a mass of pod vegetables within the drum.

Other objects, features and advantages of my invention will be apparent from the following detailed description taken in conjunction with the accompanying drawings showing a preferred embodiment of my invention.

DETAILED DESCRIPTION OF THE PREFERRED EMBODIMENT

Figure 1:
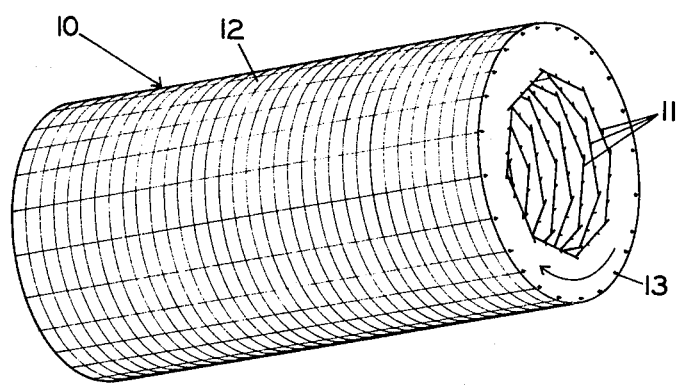
FIG. 1 is a schematic perspective view of a drum for a rotating drum-type pod vegetable processing machine incorporating my invention.

Referring more particularly to the drawings, wherein like numbers refer to like parts, FIGS. 1-4 illustrate the preferred embodiment of my device for engaging and removing clusters of pod vegetables, such as beans, which are joined together by stem sections, from a mass of such vegetables. Specifically my device comprises a substantially flat body 11 in the form of a transverse partition of a rotating drum 10, having a thickness less than the length of the stem sections connecting the pods to form clusters. Each partition 11 has a central passage defined by a multiplicity of primary edges 14, which are preferably of equal length. In my preferred embodiment these primary edges are straight, but clearly any edges which are substantially straight, including curved edges having sufficient radius of curvature to function in an equivalent manner, could also be employed without departing from the spirit of my invention.

The partitions 11 are preferably employed in a cylindrical drum of the type shown in Weirauch U.S. Pat. No. 3,405,750, such that cylindrical segments 12 are arranged end-to-end in cylindrical arrays axially spaced along the drum, with a partition 11 extending transversely between each adjacent array of segments 12. A drum 10 so formed is illustrated schematically in FIG. 1. The partitions 11 each have a plurality of peripheral fastening holes 17. The drum is held together with tie rods 13 extending the length of the drum and passing through the cylindrical segments 12 and the partition holes 17. The cylindrical segments 12 have a plurality of slots (not shown) through which the ends of the pods will protrude for snipping, and also through which stem pieces and trash will drop to effect their removal from the mass, in a conventional manner. Rotating knives (not shown) in the form of cutting discs similar to discs 11 shown in Weirauch U.S. Pat. No. 3,405,750, FIGS. 3 and 4, preferably flank each transverse partition in the upper part of the ascending side of the drum 10 to sever the stalks of clusters engaged by the partitions.

The primary edges 14a and 14b of my partitions 11 are drawn transversely through a mass of pods within the drum 10 by rotating of the drum to cause the edges to pass transversely beneath the mass. Any conventional means for rotating the drum of a rotating-drum vegetable processing machine may be employed for that purpose. The drum 10 is rotated such that the first and second primary edges 14a and 14b of the partition 11 are successively drawn through the mass of pods placed in the drum in a clockwise manner as the partition is viewed in FIG. 2.

In addition to defining the central passage for pod vegetables through the partition, the primary edges 14 also comprise a major portion of the inner, cluster-engaging margin of the partition by means of which clusters of pod vegetables are removed from the mass within the revolving drum and presented to cutting discs (not shown) or other means for severing the stalks of the clusters from the pods. My unique cluster-engaging margin employs a novel combination of edges which will now be described in detail to define an efficient cluster engaging and retaining device.

Figure 4:
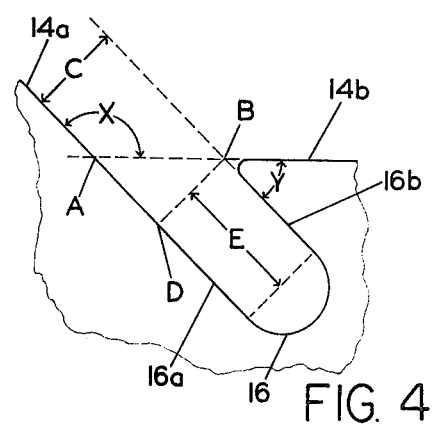
FIG. 4 is an enlarged, broken away side elevation view of a portion of the inner cluster engaging margin of my improved partition of FIG. 2, illustrating the notch between two primary edges of the margin.

As shown in FIG. 4, each pair of adjacent primary edges 14 have a projected "point of intersection" A and define an external angle X of less than 180°. The value of the angle will depend upon the number of primary edges employed to define the central passage. The first primary edge 14a of any adjacent pair of primary edges extends beyond the projected point of intersection A of the primary edges in an uninterrupted and unimpeded manner. The second primary edge 14b has a projected "point of termination" B spaced from the projected point of intersection to define a gap sufficiently large to engage the stems of the vegetables being processed.

A retaining edge 16b extends from the point of termination B at an internal angle Y of less than 180° to the second primary edge 14b and then preferably curves to intersect the first primary edge 14a to define a notch 16 in the partition between the first primary edge and he retaining edge. The first primary edge 14a extends in a straight line at least to and preferably beyond the point D, as shown, from which a line normal to the first primary edge would extend through the point of termination B of the second primary edge 14b. This part of the notch 16 defined by the first trailing end of the primary edge 14a has been designated 16a in FIG. 4 for reference purposes. Preferably the retaining edge 16b extends from the point of termination of the leading end of the second primary edge at an internal angle Y of less than 90° for a distance E in spaced, substantially parallel relation to the extended first primary edge to provide a notch 16 having a width substantially equal to the distance C between the first edge and the point of termination B. The retaining edge then curves or otherwise extends toward the first primary edge to intersect therewith in trailing relation. The edges 14a and 16b are preferaly rounded off slightly as shown at their point of intersection B to provide for ease of entry into the notch 16, and for strength. Accordingly, the term "point of intersection B" refers to either a projected point of intersection B as shown in FIG. 4, or to the actual intersection of edges 14b and 16b at the approximate midpoint of a rounded off radius of the body, of the type illustrated in FIG. 4.

In my preferred embodiment the primary edges 14a and 14b of my device are each combined with at least one intermediate notch 15. Each intermediate notch is defined by a retaining edge 15c extending from the primary edge at an internal angle of less than 180°, and preferably less than 90°, thereto. A forward edge 15a extends from the primary edge in opposed relation to the retaining edge 15c and intersects therewith to define the intermediate notch. Preferably the retaining edge 15c initially extends from the point 15b at which it intersects the primary edge in spaced substantially parallel relation to the forward edge 15a before extending toward the forward edge to intersect therewith. The intermediate notch 15 thus defined has a width substantially equal to the length of a line normal to the forward edge 15a and extending therefrom to the point of intersection 15b of the retaining edge and the primary edge. The intersections of both the forward edge 15a and the retaining edge 15c with the primary edge 14 are preferably rounded off slightly as shown for ease of entry into the intermediate notch 15, but not so much as to substantially widen the notch to permit entry of the pods of the vegetables. The width of both the primary notches 16 and the intermediate notches 15 would be less than the thickness of the pods themselves to prevent the pods from entering the notches.

The primary edges 14, and the primary and intermediate notches 16 and 15 of the partition 11 are preferably formed by punching. The outer diameter of the partition is preferably formed by circle shearing and machining in accordance with well known techniques. The peripheral fastening holes 17 may be drilled or punched, as desired.

In use, my partitions 11 are oriented within the previously described rotating drum 10 such that their primary edges 14 are in circumferential displaced relation with respect to the primary edges of each next adjacent spaced partition as best shown through the open end of the schematically shown drum of FIG. 1. Such orientation of the adjacent partitions provides an agitating passageway through the drum having an uneven effective surface as provided by the circumferentially displaced primary edges. Rotation of the drum will draw successively angled and displaced edges transversely through a mass of pod vetetables within the drum to agitate and break up the mass and prevent "roping" of the mass through the drum.

As the drum is rotated, the partitions 11 will rotate transversely in a clockwise direction as oriented in the drawings and as shown by the directional arrows. Such rotation carries the primary notches 16 defined between the adjacent primary edges 14, and the intermediate notches 15, transversely through the mass of pod vegetables. The intermediate notches 15 have a superficial similarity to the slots which have been previously employed in arcuate edges defining circular passages through transverse partitions or baffles of pod vegetables handling drums. However, it will be seen that the location of the intermediate notches 15 on primary edges which are angularly disposed with respect to the tangential path of travel of the notches causes the intermediate notches of each successive primary edge to be angularly directed into a mass of pod vegetables gravitating through the lower portion of the drum, so that the opportunity for the notches to engage the stem sections of pod vegetable clusters within the mass is optimized.

The structure and operation of the primary notches 16 between the adjacent primary edges 14 differ substantially in shape and function from the intermediate notches 15. The substantially straight trailing end 16a of each primary edge 14 provides a completely open and unimpeded entry angle to each primary notch 16. The stems of the pod clusters which are adjacent to the preceding primary edge 14a will freely enter the notch 16 without requiring a change of direction with respect to the primary edge 14a on which a portion of the mass of pod vegetables is supported within the drum. Accordingly, the trailing retaining edge 16b of the notch will move directly into the mass of pod vegetables and engage stem sections of pod clusters in a "snagging" manner, and without relying on further gravitational movement of the stem sections downwardly into the notch 16. Accordingly, stem sections which would be prevented by attached vegetation entrained within the axially moving mass from independently dropping into an upward opening notch in an arcuately disposed rotating edge will be snagged by the retaining edge 16b of the primary notches 16 at a level above that of the trailing end of the preceding primary edge 14a. Thus, the stem engaging or "snagging" action of my primary notches is seen to be an "active" action, as contrasted to the "passive" action of any upwardly facing notch in an arcuately disposed rotating edge. Once engaged by the notches 15 and 16, the pod vegetables clusters are carried upward out of the mass in the manner of the bean cluster 18 partially illustrated in FIG. 2, where they are engaged by cutting discs (not shown) or other knife apparatus to separate the pods.

Figure 2:
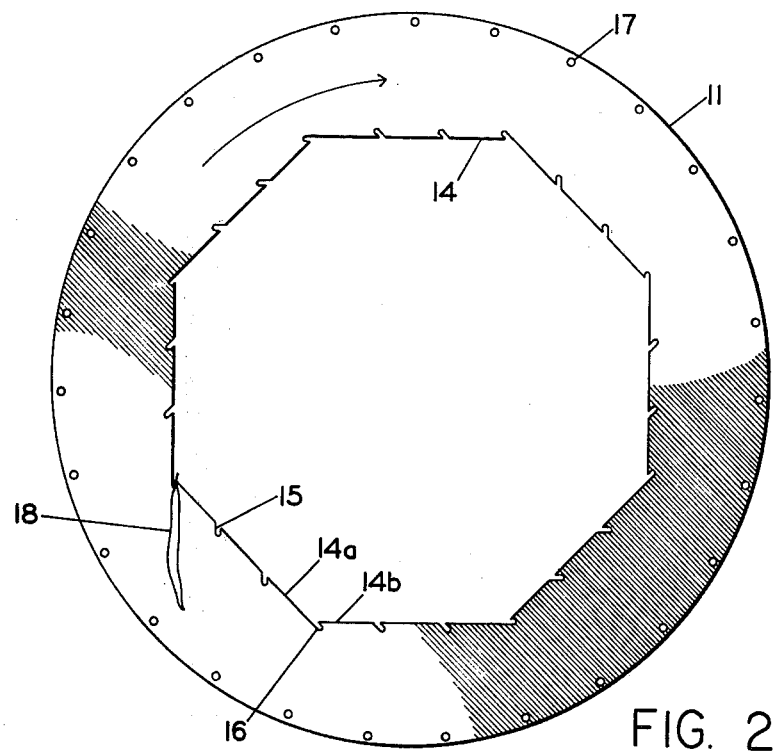
FIG. 2 is a side elevation view of my improved partition for a drum of a rotating drum-type machine for processing clustered pod vegetables.
Figure 3:
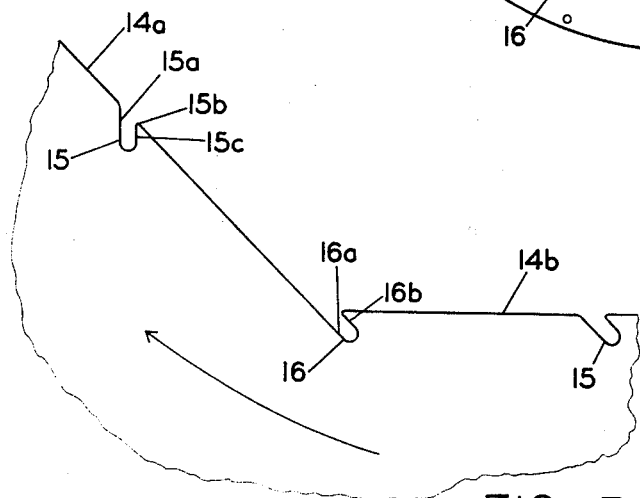
FIG. 3 is an enlarged, broken away side elevation view of a portion of the inner, cluster engaging margin of my improved partition of FIG. 2, illustrating the relationship of two adjacent primary edges.

It can be readily seen with reference to FIG. 2 that as the number of primary edges is increased, the number of primary notches 16 will also increase accordingly. However, an increase in the number of primary edges will at the same time reduce the external angle X between the adjacent primary edges, and accordingly reduce the agitating effect which the multi-edge partition will have on the entrained mass of pod vegetables, and will also reduce the angle of entry of the primary edges and intermediate notches 15 into the entrained mass. Accordingly, it is preferred that the central passage of my partitions should be defined by at least six, and preferably not more than twelve, primary edges to optimize the benefits of my invention. As shown in the drawings, a central passage defined by eight primary edges of equal length is preferred.

It is understood that my invention is not confined to the particular construction and arrangement of parts herein illustrated and described, and that various changes may be made without departing from the spirit of the invention. My invention embraces all such modified forms thereof as come within the scope of the following claims.

I claim:

1. A device for engaging and removing clusters of pod vegetables joined together by stem sections from a mass of such vegetables comprising:
   (a) a substantially flat body having a thickness less than the length of the stem sections connecting the pod vegetables to form clusters,
   (b) first and second substantially straight primary edges of the body having a projected point of intersection and defining an external angle of less than 180°, the first primary edge extending beyond the projected point of intersection of the primary edges in a continuous manner without change of direction,
   (c) the second primary edge having a point of termination spaced from the projected point of intersection to define a gap between the primary edges sufficiently large to admit the stems of the pod vegetables to be engaged, the first primary edge further extending in a straight line beyond the point from which a line normal to the first primary edge would extend through the point of termination of the second primary edge, and
   (d) a retaining edge extending from the point of termination at an internal angle of less than 180° to the second primary edge and intersecting the extended first primary edge in trailing relation to define a notch in the body between the extended first primary edge and the retaining edge, whereby as the body is drawn through a mass of pod vegetables with the first and second primary edges substantially upwardly facing the lower margin of the notch will be defined by the extended first primary edge to provide a completely open and unimpeded entry path such that the stems of pod clusters adjacent to the first primary edge may freely enter the notch along the substantially straight first primary edge without change of direction with respect to the first primary edge and be engaged by the retaining edge for removal from the mass.

2. The device for engaging and removing clusters of pod vegetables specified in claim 1 wherein the angle of the body between the retaining edge and the second primary edge is not greater than 90°.

3. The device for engaging and removing clusters of pod vegetables specified in claim 1 wherein the retaining edge initially extends from the point of termination of the second primary edge in spaced, substantially parallel relation to the first primary edge to provide a notch having a width substantially equal to the shortest distance between the first primary edge and the point of termination of the second primary edge, and then extends toward the first primary edge to intersect therewith.

4. The device for engaging clusters of pod vegetables specified in claim 1 including in combination therewith at least one intermediate notch in each primary edge, each intermediate notch being defined by a trailing retaining edge extending from the primary edge at an initial angle of less than 180° thereto, and a forwrd edge extending from the primary edge in opposed relation to the retaining edge, whereby the stems of clusters of pods will be engaged and removed from the mass by the retaining edge.

5. The device for engaging and removing clusters of pod vegetables specified in claim 4 wherein the intermediate notch retaining edge initially extends rearwardly with respect to the direction of movement of the body at an internal angle of less than 90° to the primary edge and in spaced, substantially parallel relation to the forward edge whereby the notch has a width substantially equal to the shortest distance between the forward edge and the point of intersection of the retaining edge and the primary edge, and then extends toward the forward edge to intersect therewith.

6. In a transverse partition for a rotating drum of a machine for processing clustered pod vegetables, an inner, cluster-engaging margin comprising:
   (a) a plurality of substantially straight primary edges defining a passage through the partition, the first and second primary edges of at least one set of two, contiguous primary edges having a projected point of intersection and defining an external angle of less than 180°,
   (b) the first primary edge extending beyond the projected point of intersection of the primary edges in a continuous manner without change of direction,
   (c) the second primary edge having a point of termination spaced from the projected point of intersection to define a gap between the first and second primary edges sufficiently large to admit the stems of the pod vegetables to be engaged, the first primary edge further extending in a straight line beyond the point from which a line normal to the first primary edge would extend through the point of termination of the second primary edge, and
   (d) a retaining edge extending from the point of termination at an internal angle of less than 180° to the second primary edge and intersecting the extended first primary edge in trailing relation to define a notch in the partition between the extended first primary edge and the retaining edge, whereby as the drum rotates and the primary edges of the partition are thereby drawn through a mass of pod vegetables within the drum with the first and second primary edges adopting a substantially upwardly facing orientation once in each rotation the lower margin of the notch will be defined by the upwardly facing extended first primary edge to provide a completely open and unimpeded entry path such that the stems of pod clusters adjacent to the first primary edge may freely enter the notch along the substantially straight first primary edge without change of direction with respect to the first primary edge and be engaged by the trailing retaining edge for removal from the mass.

7. The partition specified in claim 6 wherein the plurality of primary edges comprises at least six edges.

8. The partition specified in claim 6 wherein the plurality of primary edges comprises eight primary edges of substantially equal length.

9. The partition specified in claim 6 wherein the angle of the partition between the retaining edge and the second primary edge is not greater than 90°.

10. The partition specified in claim 6 wherein the retaining edge initially extends from the point of termination of the second primary edge in spaced, substantially parallel relation to the first primary edge to provide a notch having a width substantially equal to the shortest distance between the first primary edge and the point of termination of the second primary edge, and then extends toward the first primary edge to intersect therewith.

11. The partition specified in claim 6 including in combination therewith at least one intermediate notch in each primary edge, each intermediate notch being defined by a trailing retaining edge extending from the primary edge at an initial angle of less than 180° thereto, and a forward edge extending from the primary edge in opposed relation to the retaining edge, whereby the stems of clusters of pods will be engaged and removed from the mass by the retaining edge.

12. The partition specified in claim 11 wherein the intermediate notch retaining edge initially extends rearwardly with respect to the direction of rotation of the partition at an internal angle of less than 90° to the primary edge in spaced, substantially parallel relation to the forward edge whereby the notch has a width substantially equal to the shortest distance between the forward edge and the point of intersection of the retaining edge and the primary edge, and then extends toward the forward edge to intersect therewith.

13. An improved drum for a machine for processing clustered pod vegetables of the type having a rotating cylindrical drum formed by a multiplicity of cylindrical segments separated in an axial direction by a plurality of spaced annular partitions having central openings therethrough for the passage of the pod vegetables, wherein the improvement comprises a plurality of spaced partitions each having an inner cluster-engaging margin comprising:
   (a) at least six straight primary edges generally defining a passage through the partition, the first and second of any two, contiguous primary edges having a projected point of intersection,
   (b) the first primary edge extending beyond the projected point of intersection of the first and second primary edges in a continuous manner without change of direction,
   (c) the second primary edge having a point of termination spaced from the projected point of intersection to define a gap between the first and second primary edges sufficiently large to admit the stems of the pod vegetables to be engaged, the first primary edge further extending in a straight line beyond the point from which a line normal to the first primary edge would extend through the point of termination of the second primary edge, and
   (d) a retaining edge extending from the point of termination at an internal angle of less than 180° to the second primary edge and intersecting the first primary edge in trailing relation to define a notch in the partition between the first primary edge and the retaining edge, whereby as the drum rotates and the primary edges of the partition are thereby drawn through a mass of pod vegetables within the drum with the first and second primary edges adopting a substantially upwardly facing orientation once in each rotation the lower margin of each notch will be defined by the upwardly facing extended first primary edge to provide a completely open and unimpeded entry path such that the stems of pod clusters adjacent to the primary edge may freely enter the notch along the substantially straight first primary edge without change of direction with respect to the first primary edge and be engaged by the retaining edge for removal from the mass, said partitions each being oriented with their primary edges in circumferentially displaced relation with respect to the primary edges of each next adjacent spaced partition to provide an agitating passageway through the drum defined by the primary edges of the spaced partitions to agitate and facilitate separation of individual pod vegetables and clusters from a mass.

14. The improved drum specified in claim 13 wherein the internal angle between the retaining edge and the second primary edge is not greater than 90°.

15. The improved drum sepcified in claim 13 wherein the retaining edge initally extends from the point of termination of the second primary edge in spaced, substantially parallel relation to the first primary edge to provide a notch having a width substantially equal to the shortest distance between the first primary edge and the point of termination of the second primary edge, and then extends toward the first primary edge to intersect therewith.

16. The improved drum specified in claim 13 including in combination therewith at least one intermediate notch in each primary edge, each intermediate notch being defined by a trailing retaining edge extending from the primary edge at an initial angle of less than 180° thereto, and a forward edge extending from the primary edge in opposed relation to the retaining edge, whereby the stems of clusters of pods will be engaged by the retaining edge.

17. The improved drum specified in claim 6 wherein the intermediate notch retaining edge intially extends rearwardly with respect to the direction of rotation of the partition at an internal angle of less than 90° to the primary edge from the point at which it intersects the primary edge in spaced, substantially parallel relation to the forward edge whereby the notch has a width substantially equal to the shortest distance from the forward edge to the point of intersection of the retaining edge and the primary edge, and when extends toward the forward edge to intersect therewith.

* * * * *